United States Patent
Jespersen et al.

(10) Patent No.: US 12,138,866 B2
(45) Date of Patent: Nov. 12, 2024

(54) METHOD OF MANUFACTURING WIND TURBINE BLADE WITH CORE MEMBER AND WIND TURBINE BLADE WITH STRUCTURAL MEMBER

(71) Applicant: LM WIND POWER A/S, Kolding (DK)

(72) Inventors: Klavs Jespersen, Kolding (DK); Lars Nielsen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/037,303

(22) PCT Filed: Nov. 16, 2021

(86) PCT No.: PCT/EP2021/081852
§ 371 (c)(1),
(2) Date: May 16, 2023

(87) PCT Pub. No.: WO2022/106417
PCT Pub. Date: May 27, 2022

(65) Prior Publication Data
US 2023/0415426 A1    Dec. 28, 2023

(30) Foreign Application Priority Data
Nov. 17, 2020    (GB) .................................... 2018042

(51) Int. Cl.
*F03D 80/30*    (2016.01)
*B29C 70/30*    (2006.01)
(Continued)

(52) U.S. Cl.
CPC ............ *B29C 70/30* (2013.01); *B29C 70/865* (2013.01); *B29C 70/885* (2013.01);
(Continued)

(58) Field of Classification Search
CPC .............................. F03D 1/0675; F03D 80/31
See application file for complete search history.

(56) References Cited

U.S. PATENT DOCUMENTS 3,385,624 A * 5/1968 Baclini ................. E05B 15/024
403/4
5,141,357 A    8/1992 Sherman et al.
(Continued)

FOREIGN PATENT DOCUMENTS

EP    2930352 B1    7/2018

*Primary Examiner* — Brian O Peters
(74) *Attorney, Agent, or Firm* — Nath, Goldberg & Meyer; Tanya E. Harkins

(57) ABSTRACT

The present invention relates to a method of manufacturing a wind turbine blade (10), comprising the steps of placing a fibre lay-up including one or more fibre layers on the mould surface of a blade mould (60), arranging a load-bearing structure (45) and a core member (62) on the fibre lay-up such that the core member (62) is arranged between the load-bearing structure (45) and the leading edge (18) and/or between the load-bearing structure (45) and the trailing edge (20), and infusing resin into the blade mould to impregnate the fibre lay-up. The core member (62) comprises a first hole (64) with a circular cross section, a first cylindrical insert (70) rotatably arranged within the first hole (64) of the core member (62), the first cylindrical insert (70) having a central axis (71). A recess (80) is formed in the first cylindrical insert (70), wherein the recess (80) is arranged eccentrically with respect to the central axis (71) of the first cylindrical insert (70).

14 Claims, 4 Drawing Sheets

Figure 1:
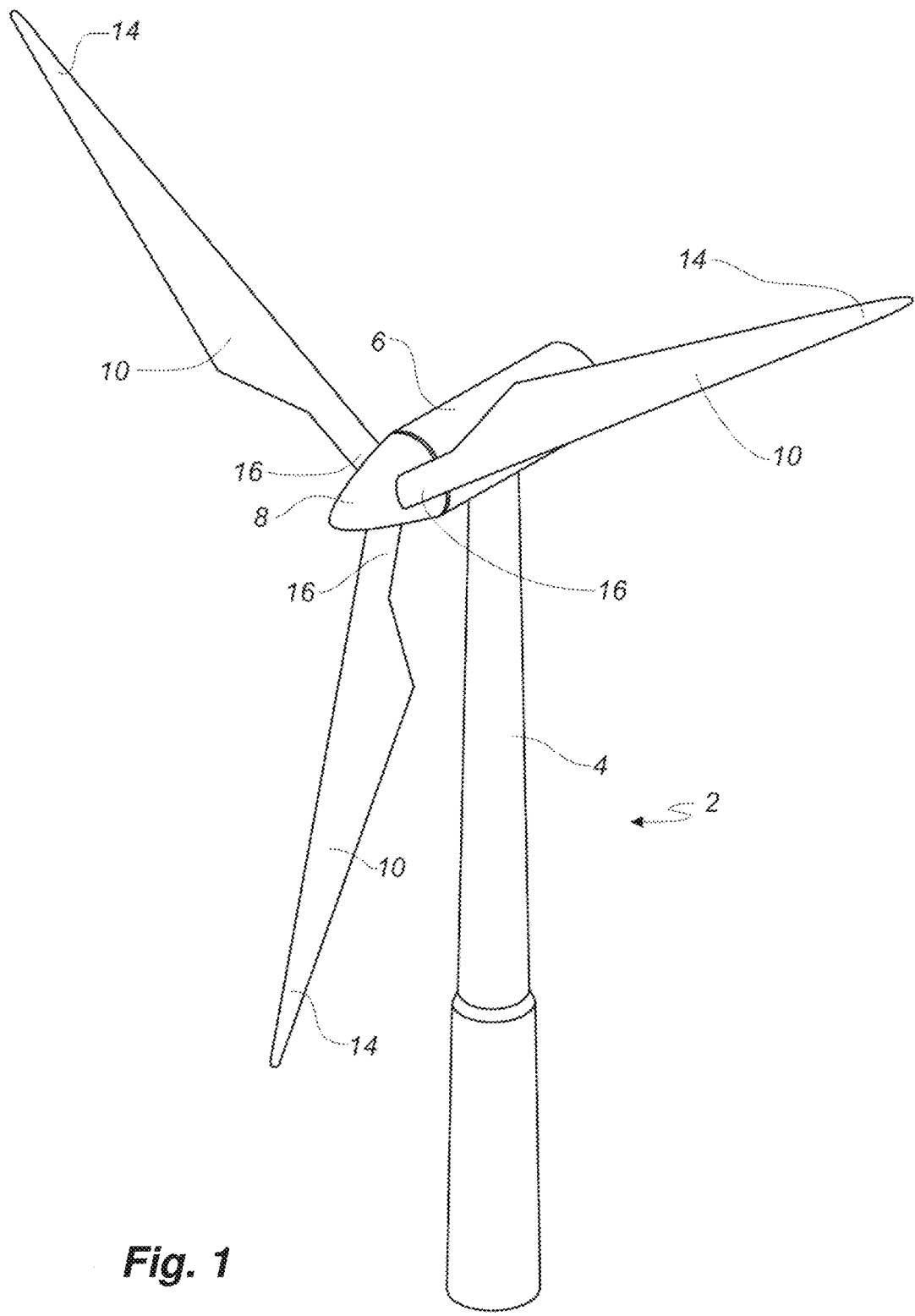

(51) Int. Cl.
 B29C 70/86 (2006.01)
 B29C 70/88 (2006.01)
 F03D 1/06 (2006.01)
 B29L 31/08 (2006.01)

(52) U.S. Cl.
 CPC ........... F03D 1/0675 (2013.01); F03D 80/30 (2016.05); *B29L 2031/085* (2013.01); *F05B 2230/31* (2013.01)

(56) References Cited

U.S. PATENT DOCUMENTS

2006/0039749 A1 2/2006 Gawehn
2018/0180032 A1 6/2018 Klein et al.

* cited by examiner

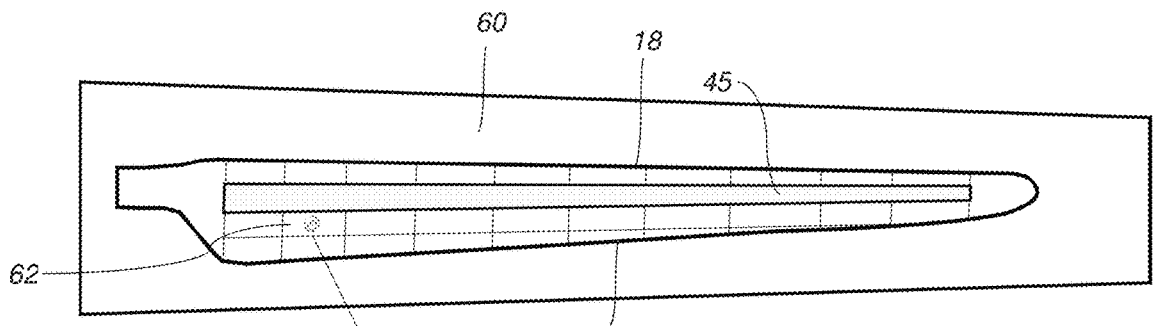
*Fig. 4a*
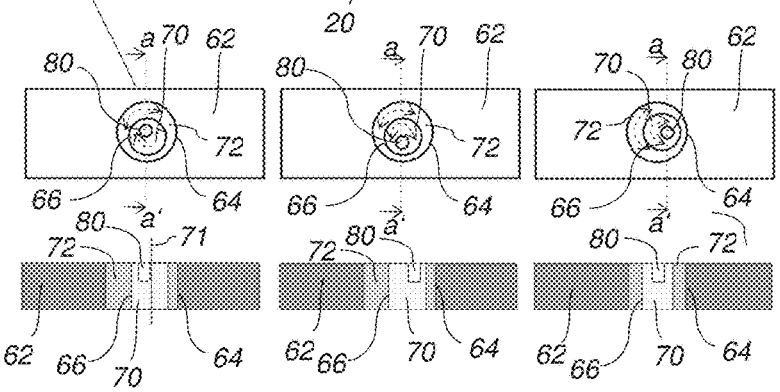
*Fig. 4b*
*Fig. 4c*
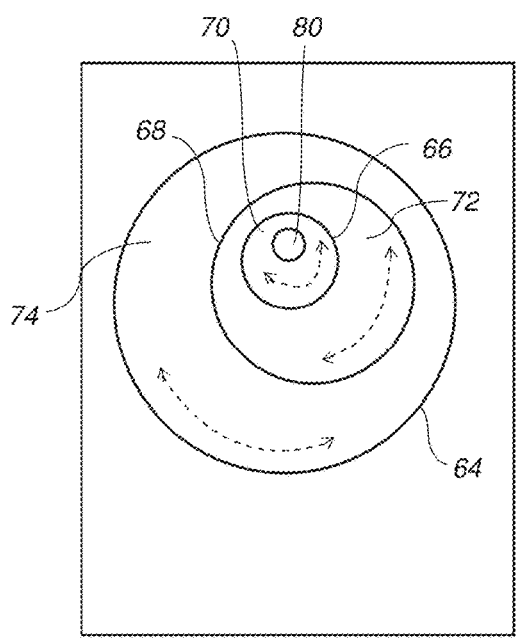
*Fig. 5a*
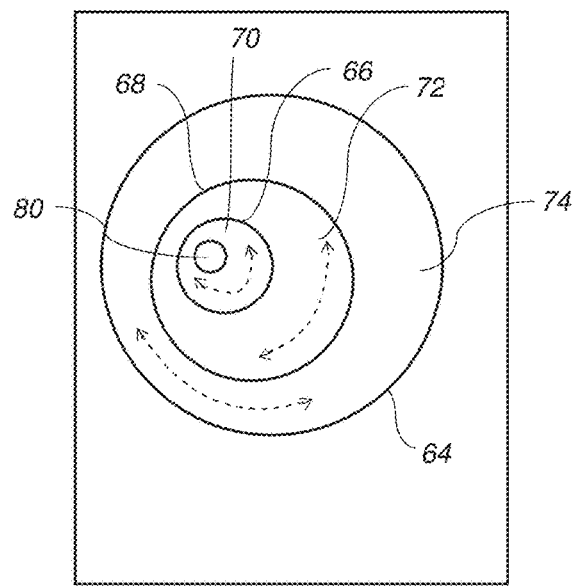
*Fig. 5b*

METHOD OF MANUFACTURING WIND TURBINE BLADE WITH CORE MEMBER AND WIND TURBINE BLADE WITH STRUCTURAL MEMBER

This is a National Phase Application filed under 35 U.S.C. 371 as a national stage of PCT/EP2021/081852, filed Nov. 16, 2021, an application claiming the benefit of United Kingdom Application No. 2018042.8, filed Nov. 17, 2020, the content of each of which is hereby incorporated by reference in its entirety.

FIELD OF THE INVENTION

The present invention relates to a method of manufacturing a wind turbine blade comprising a core member and to a wind turbine blade obtainable by said method.

BACKGROUND OF THE INVENTION

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Spar caps or main laminates are placed or integrated in the shell halves and may be combined with shear webs or spar beams to form structural support for the blade. Spar caps or main laminates may be joined to, or integrated within, the inside of the suction and pressure halves of the shell.

Wind turbine rotor blades are often produced using a sandwich construction, in which a core is provided on either sides of a fibre composite material. Such core material may be made of balsa wood, plastic, foam and/or honeycomb. In some of these sandwich constructions, a through hole must be formed within the core material for receiving one or more functional components such as receptors or conductors for lightning protection of the wind turbine, transverse bolts for attachment of the rotor blade, means for hazard identification, sensors and/or drainage devices.

These known methods of manufacturing wind turbine blades have a number of disadvantages as they tend to consume a disproportionate amount of manpower, time and expertise, during construction as well as in latter quality control procedures. Specifically, the step of fitting the functional component into core material during the blade shell manufacturing process in the blade mould can be challenging and time-consuming with respect to creating an acceptable/perfect fit within the required tolerances. Functional components must fit into a pre-made groove/dent in the core material that is already placed in the blade shell. Thus, the location of such embedded functional components can only be adjusted by cutting away core material and adjusting the location in the blade shell layup process. This is tedious and time-consuming.

It is therefore an object of the present invention to provide a structural member for a wind turbine blade that allows for a more efficient and flexible placement of functional blade components.

It is another object of the present invention to provide a method for manufacturing a wind turbine blade which avoids destructive and time consuming cut-outs in the core material after lay-up in the mould.

It is another object of the present invention to provide a less time-consuming and cheaper method of manufacturing a wind turbine blade, and an improved way of keeping manufacturing tolerances.

SUMMARY OF THE INVENTION

It has been found that one or more of the aforementioned objects can be obtained by providing a method of manufacturing a wind turbine blade having a profiled contour including a pressure side and a suction side, and a leading edge and a trailing edge with a chord having a chord length extending therebetween, the wind turbine blade extending in a spanwise direction between a root end and a tip end, the method comprising the steps of arranging a fibre lay-up including one or more fibre layers within a mould cavity of a blade mould, arranging a load-bearing structure and a core member on the fibre lay-up such that the core member is arranged between the load-bearing structure and the leading edge and/or between the load-bearing structure and the trailing edge, supplying resin to the fibre lay-up, the load bearing structure and the core member, and curing the resin, wherein the core member comprises a first hole with a circular cross section, a first cylindrical insert rotatably arranged within the first hole of the core member, the first cylindrical insert having a central axis, a recess formed in the first cylindrical insert, preferably in the top base or the bottom base of the cylindrical insert, wherein the recess is arranged eccentrically with respect to the central axis of the first cylindrical insert.

This is found to provide an easy and efficient adjustment of the location of the recess within the necessary distance range, thus avoiding destructive and time consuming cut-outs in the core material after lay-up in the mould. By rotating the cylindrical inserts relative to the core member it is possible to move the recess to the needed location. This results in significant reduction of mould cycle time compared to prior art solutions. Also, the method of the present invention avoids resin pools created within the core member due to wrong/bad workmanship when having to form additional cut-outs after lay-up.

The blade mould will typically comprise a mould for a shell half of the wind turbine blade. In some embodiments, the top side and the bottom side of the blade profile, typically the pressure side and suction side, respectively, are manufactured separately by arranging a fibre lay-up in each of the two mould parts. Afterwards, the two halves can be glued together, often by means of internal flange parts. Glue is applied to the inner face of the lower blade half before the upper blade half is lowered thereon. Additionally, one or two shear webs are often attached to the inside of the blade halves.

The shell parts for the wind turbine blade are typically manufactured as fibre composite structures by means of VARTM (vacuum assisted resin transfer moulding), where liquid polymer, also called resin, is filled into the blade mould cavity, in which the fibre lay-up has been inserted together with the load-bearing structure and the core material, and where a vacuum is generated in the mould cavity, hereby drawing in the polymer. The polymer can be thermoset plastic or thermoplastics.

Typically, the mould cavity is covered with a resilient vacuum bag. By generating a vacuum, the liquid resin can be drawn in and fill the mould cavity with the fibre material contained herein. In most cases, the resin applied is polyester or epoxy, and typically the fibre lay-up is based on glass fibres and/or carbon fibres.

The wind turbine blade of the present invention comprises one or more core members, such as sandwich core members, which are optionally covered with, or sandwiched between, a fibre reinforced material, such as one or more fibre reinforced polymer layers. The core members can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material.

The load-bearing structure is preferably a spar cap or a main laminate. According to some embodiments, the method further comprises a step of arranging one or more shear webs on the load-bearing structure. Each shear web may comprise a web body, a first web foot flange at a first end of the web body, and a second web foot flange at a second end of the web body. In some embodiments, the shear webs are substantially I-shaped. Alternatively, the shear webs may be substantially C-shaped.

One or more core members are arranged between the load-bearing structure and the leading edge and/or between the load-bearing structure and the trailing edge. Thus, the core members are preferably arranged adjacent to the load-bearing structure, seen in a chordwise direction. The blade may comprise at least 5, such as at least 10 of such core members, which may be provide as blocks of core material, such as blocks of polymer form or blocks of balsawood.

The step of supplying resin to the fibre lay-up, the load bearing structure and the core member is preferably carried out using a VARTM process. In some embodiments, one or more of the core members are blocks of core material, such as blocks of balsawood or blocks of foamed polymer. The blocks may have a substantially rectangular cross section.

At least one of the core members used in the blade manufacturing process of the present invention comprises a first hole with a circular cross section and a first cylindrical insert rotatably arranged within the first hole of the core member. In some embodiments, two or more, such as four or more of the core members comprise a respective first hole with a circular cross section and the first cylindrical insert rotatably arranged within the first hole of the core member. In one embodiment, at least one of the core members on either chordwise side of the load-bearing structure comprises a first hole with a circular cross section and a first cylindrical insert rotatably arranged within the first hole of the core member. In some embodiments, two or more, such as four or more of the core members comprise a respective first hole with a circular cross section and the first cylindrical insert rotatably arranged within the first hole of the core member.

In a preferred embodiment, the first hole has a diameter of between 30 and 300 mm. It is preferred that the first hole is a through hole. The through hole may be extending from one side of the core member, for example its top surface, to an opposing side of the core member, for example its bottom surface. The top surface of the core member faces upwards, and the bottom surface of the core member faces downward, when the core member is arranged in the mould cavity. In a preferred embodiment, the first hole is a substantially vertical through hole extending in a substantially flapwise direction of the blade. The first hole preferably has a cylindrical shape. When a sandwich core member is used the first hole may also extend through the fibre layer(s) in between which the core member is arranged.

The first cylindrical insert will typically be a circular-cylindrical insert. Thus, the cylindrical insert will usually have a circular cross section along its entire length. It is preferred that each of the cylindrical inserts are shaped as a right-circular cylinder. The cylindrical insert will usually comprise a circular or disk-shaped top base, a circular or disk-shaped bottom base and a side surface in between the top base and the bottom base. In some embodiments, the first cylindrical insert is received directly within the first hole of the core member. In other embodiments, the first cylindrical insert is received within the first hole of the core member via one or more additional cylindrical inserts, such as a second and a third cylindrical insert, as is further explained below.

The first cylindrical insert has a central axis, extending through the centre of its circular cross section. Thus, central axis passes through the respective centres of its two bases, i.e. the top base and the bottom base of the cylinder. The first cylindrical comprises a recess, wherein the recess is arranged eccentrically with respect to the central axis of the first cylindrical insert. Thus, the recess is offset from the central axis of the first cylindrical insert. Typically, the recess will be formed within the circular top base of the cylindrical insert. The top base typically faced upward when the core member with the cylindrical insert is arranged in the blade mould, whereas the bottom base is typically faced downwards in the blade mould.

In some embodiments, the recess has a circular cross section. In other embodiments, the recess has a rectangular or an elliptical cross section. In some embodiments, the recess may be shaped as a slot, a channel, a groove or a cavity extending in the top base surface or in the bottom base surface of the first cylindrical insert. Preferably, the recess does not extend through the entire cylindrical insert. In other embodiments, the recess is a through hole extending through the first cylindrical insert.

In a preferred embodiment, the method further comprises inserting a functional component into the recess of the first cylindrical insert after arranging the core member on the fibre lay-up. In a preferred embodiment, the functional component is selected from the group consisting of a receptor or a conductor of a blade lightning protection system, a fastening member such as a bolt, a sensor and a drainage device. It is particularly preferred that the functional component is a component of a lightning protection system of the blade. The component of the lightning protection system may be a strike termination device such as a lightning rod, a conductor, a ground rod, or an equipotential bonding and surge protection device. In some embodiments, the functional component is a current connection terminal, or a part thereof, of a lightning protection system.

In a preferred embodiment, the method further comprises, after arranging the core member on the fibre lay-up, rotating the first cylindrical insert relative to the core member for adjusting the position of the recess within the core member. Thus, the position of the recess is advantageously adjustable after the core member has been arranged within the blade mould cavity and after the core member is fixed to one or more other blade members such as the fibre lay-up or the load-bearing structure. Thus, the need for cutting or otherwise forming (additional) recesses for receiving functional components due to poor alignment or manufacturing tolerances is overcome by the present invention. In some embodiments, a chordwise distance between the recess and the load bearing structure is adjusted by rotating the first cylindrical insert relative to the core member. In some embodiments, a spanwise distance between the recess and the blade tip is adjusted by rotating the first cylindrical insert relative to the core member.

In a preferred embodiment, the core member further comprises a second cylindrical insert rotatably arranged within the first hole of the core member, wherein the diameter of the second cylindrical insert exceeds the diameter of the first cylindrical insert, the second cylindrical insert having a central axis and a second hole with a circular cross section, the second hole being arranged eccentrically with respect to the central axis of the second cylindrical insert, and wherein the first cylindrical insert is rotatably arranged within the second hole of the second cylindrical insert.

In a preferred embodiment, the method further comprises rotating the second cylindrical insert relative to the core member after arranging the core member on the fibre lay-up for adjusting the position of the recess within the core member. In some embodiments, a chordwise distance between the recess and the load bearing structure is adjusted by rotating the second cylindrical insert relative to the core member. In some embodiments, a spanwise distance between the recess and the blade tip is adjusted by rotating the second cylindrical insert relative to the core member.

In a preferred embodiment, the core member comprises a third cylindrical insert rotatably arranged within the first hole of the core member, wherein the diameter of the third cylindrical insert exceeds the diameter of the second cylindrical insert, the third cylindrical insert having a central axis and a third hole with a circular cross section, the third hole being arranged eccentrically with respect to the central axis of the third cylindrical insert, and wherein the second cylindrical insert is rotatably arranged within the third hole of the third cylindrical insert. In some embodiments, a chordwise distance between the recess and the load bearing structure is adjusted by rotating the third cylindrical insert relative to the core member. In some embodiments, a spanwise distance between the recess and the blade tip is adjusted by rotating the third cylindrical insert relative to the core member.

In a preferred embodiment, the method further comprises rotating the third cylindrical insert relative to the core member after arranging the core member on the fibre lay-up for adjusting the position of the recess within the core member.

In a preferred embodiment, the method further comprises cutting a cylindrical opening into or through the core member to provide the first hole with a circular cross section and the first cylindrical insert. This step may be carried out with a cutting tool, such as a hole saw, for example comprising a hollow drill bit with a cutting blade along the outer edge.

In another aspect, the present invention relates to a wind turbine blade obtainable by the afore-described method.

In another aspect, the present invention relates to a wind turbine blade having a profiled contour including a pressure side and a suction side, and a leading edge and a trailing edge with a chord having a chord length extending therebetween, the wind turbine blade extending in a spanwise direction between a root end and a tip end, wherein the wind turbine blade comprises a structural member, such as core member or a sandwich core member, arranged within the blade, the structural member comprising a first hole with a circular cross section, a first cylindrical insert rotatably arranged within the first hole of the structural member, the first cylindrical insert having a central axis, a recess formed in the first cylindrical insert, wherein the recess is arranged eccentrically with respect to the central axis of the first cylindrical insert.

In a preferred embodiment, the blade further comprises a second cylindrical insert rotatably arranged within the first hole of the structural member, wherein the diameter of the second cylindrical insert exceeds the diameter of the first cylindrical insert, the second cylindrical insert having a central axis and a second hole with a circular cross section, the second hole being arranged eccentrically with respect to the central axis of the second cylindrical insert, and wherein the first cylindrical insert is rotatably arranged within the second hole of the second cylindrical insert.

In a preferred embodiment, the blade further comprises a third cylindrical insert rotatably arranged within the first hole of the structural member, wherein the diameter of the third cylindrical insert exceeds the diameter of the second cylindrical insert, the third cylindrical insert having a central axis and a third hole with a circular cross section, the third hole being arranged eccentrically with respect to the central axis of the third cylindrical insert, and wherein the second cylindrical insert is rotatably arranged within the third hole of the third cylindrical insert.

In a preferred embodiment, the recess is configured for receiving a blade component selected from the group consisting of a receptor or a conductor of a blade lightning protection system, a fastening member such as a bolt, a sensor and a drainage device.

In a preferred embodiment, the first, second and/or third hole is a through hole. In a preferred embodiment, the first hole has diameter of 10-300 mm, preferably 50-250 mm. In a preferred embodiment, the first, second and/or third cylindrical insert has the shape of a right circular cylinder In another aspect, the present invention relates to a structural member, such as a core member or a sandwich core member, for arrangement in a wind turbine rotor blade, the structural member comprising a first hole with a circular cross section, a first cylindrical insert rotatably arranged within the first hole of the structural member, the first cylindrical insert having a central axis, a recess formed in the first cylindrical insert, wherein the recess is arranged eccentrically with respect to the central axis of the first cylindrical insert.

In a preferred embodiment, the structural member is a core member, such as a sandwich core member made of balsawood or a polymer. In some embodiments, the structural member is a block of core material, such as a block of balsawood or a block of foamed polymer. The block may have a substantially rectangular cross section.

In a preferred embodiment, the structural member further comprises a second cylindrical insert rotatably arranged within the first hole of the structural member, wherein the diameter of the second cylindrical insert exceeds the diameter of the first cylindrical insert, the second cylindrical insert having a central axis and a second hole with a circular cross section, the second hole being arranged eccentrically with respect to the central axis of the second cylindrical insert, and wherein the first cylindrical insert is rotatably arranged within the second hole of the second cylindrical insert.

In a preferred embodiment, the structural member further comprises a third cylindrical insert rotatably arranged within the first hole of the structural member, wherein the diameter of the third cylindrical insert exceeds the diameter of the second cylindrical insert, the third cylindrical insert having a central axis and a third hole with a circular cross section, the third hole being arranged eccentrically with respect to the central axis of the third cylindrical insert, and wherein the second cylindrical insert is rotatably arranged within the third hole of the third cylindrical insert.

All features and embodiments discussed above with respect to the method of manufacturing a wind turbine blade likewise apply to the wind turbine blade and to the structural member of the present invention and vice versa.

As used herein, the term "structural member" means any individual member that is joined with any other member of the wind turbine blade, such as fibre lay-up, to form a structure.

As used herein, the term "spanwise" is used to describe the orientation of a measurement or element along the blade from its root end to its tip end. In some embodiments, spanwise is the direction along the longitudinal axis and longitudinal extent of the wind turbine blade.

DESCRIPTION OF THE INVENTION

Figure 2:
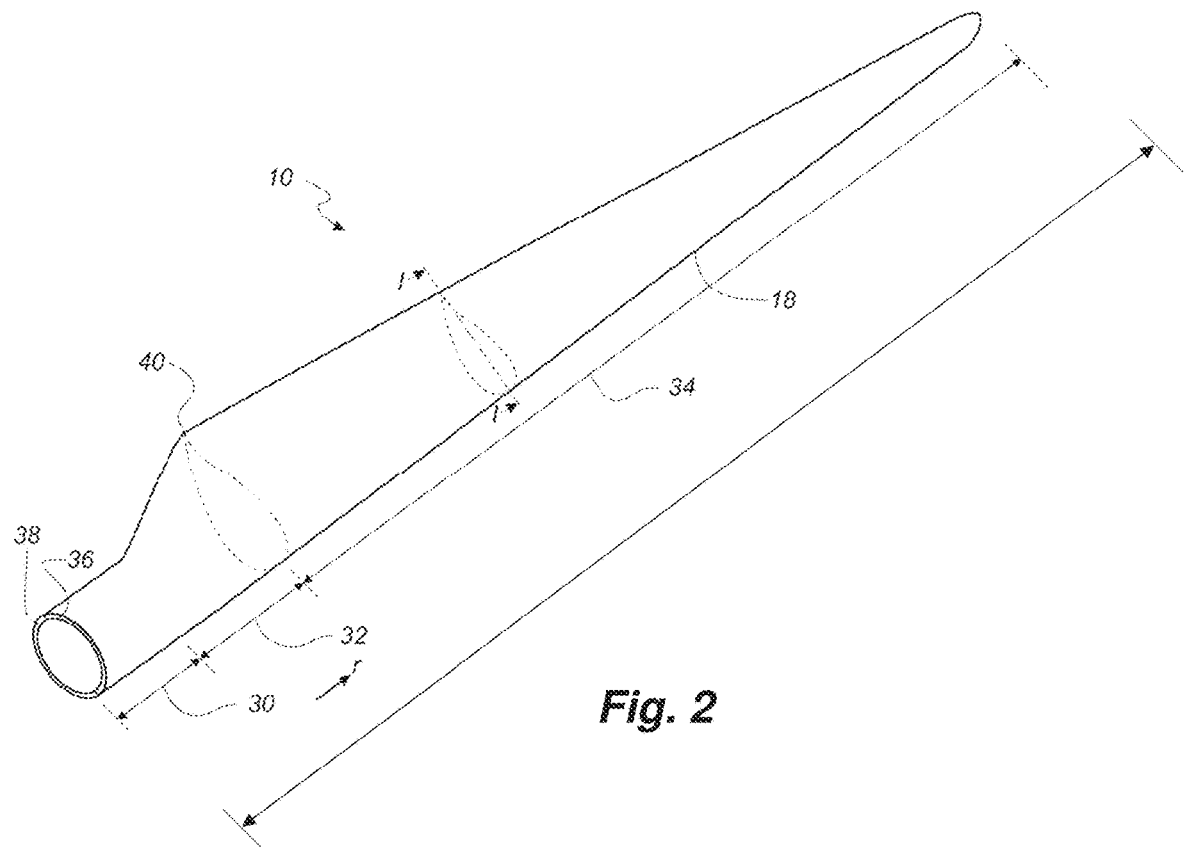
Figure 3:
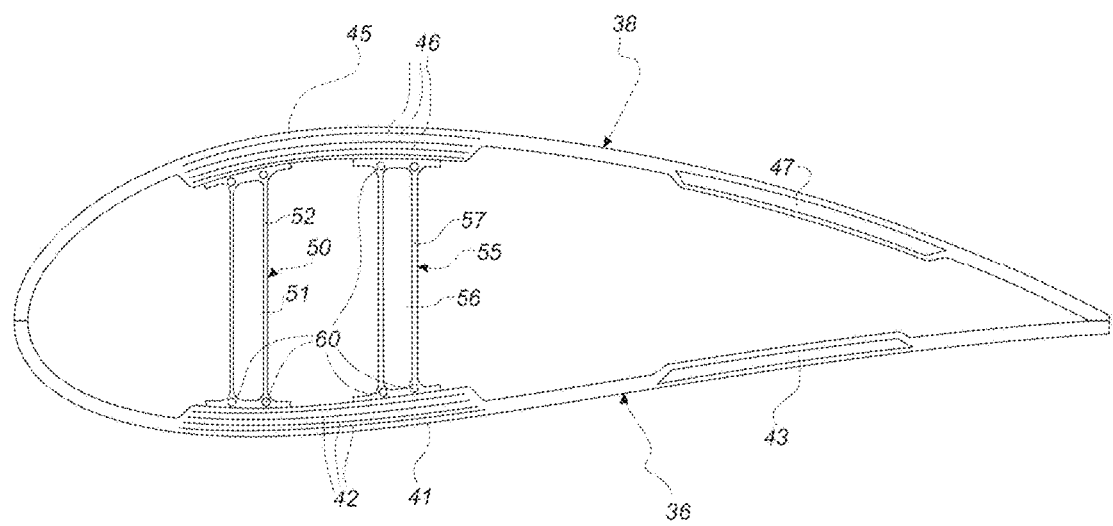
Figure 6:
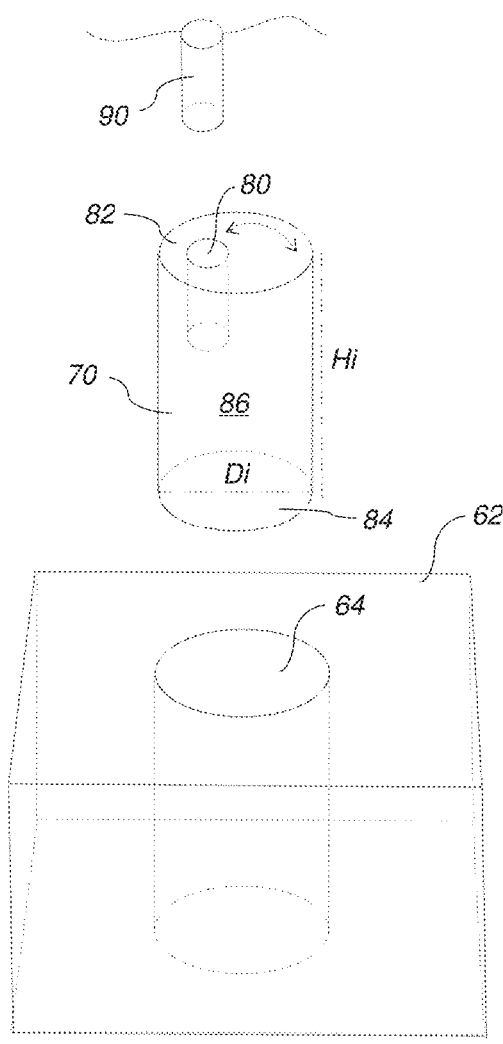
Figure 7:
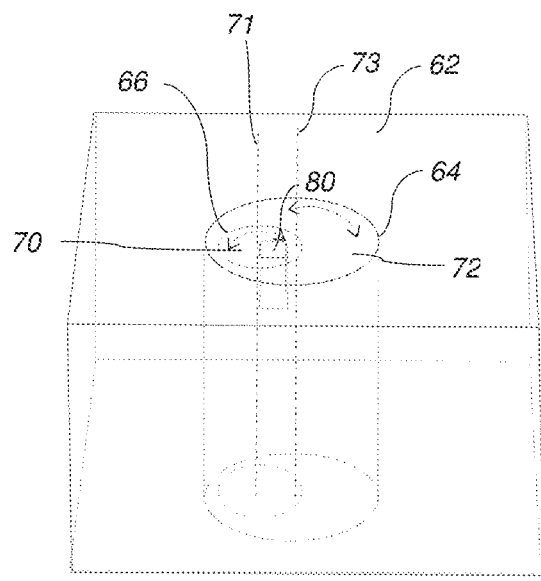

The invention is explained in detail below with reference to an embodiment shown in the drawings, in which FIG. 1 shows a wind turbine, FIG. 2 shows a schematic view of a wind turbine blade, FIG. 3 shows a schematic view of a cross-section of a wind turbine blade, FIG. 4 is schematic top view of the blade shell half according to the present invention, an enlarged partial top view and a cross sectional view, FIG. 5 is a schematic top view of one embodiment of a structural member of the present invention, FIG. 6 is a three-dimensional perspective view of another embodiment of a structural member of the present invention, and FIG. 7 is a three-dimensional perspective view of another embodiment of a structural member of the present invention.

DETAILED DESCRIPTION OF THE FIGURES

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34. FIG. 2 also illustrates the longitudinal extent L, length or longitudinal axis of the blade.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 36 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges. The shear web body comprises a sandwich core material 51, such as balsawood or foamed polymer, covered by a number of skin layers 52 made of a number of fibre layers. The blade shells 36, 38 may comprise further fibre-reinforcement at the leading edge and the trailing edge. Typically, the shell parts 36, 38 are bonded to each other via glue flanges.

FIG. 4a is schematic top view of a blade shell half of a wind turbine blade according to the present invention, FIG. 4b is an enlarged partial top view of the core member 62 of FIG. 4a, and FIG. 4c is a cross sectional view along the line a-a' in FIG. 4b. In the method of the present invention, one or more fibre layers are arranged on the mould surface of a blade mould 60. Then, a load-bearing structure 45, such as a spar cap or main laminate, and a core member 62 are arranged on the fibre lay-up such that the core member 62 is arranged between the load-bearing structure 4 and the leading edge 18 and/or between the load-bearing structure 45 and the trailing edge 20, i.e. preferably on either chordwise side of the spar cap 45. Resin can be infused into the blade mould 60 to impregnate the fibre lay-up, the spar cap 45 and the core member 45. As seen in the enlarged top view of FIG. 4b and in the cross-section of FIG. 4c, the core member 62 comprises a first hole 64 with a circular cross section. A first cylindrical insert 70 is rotatably arranged within the first hole 64 of the core member 62; see also FIG. 6.

The first cylindrical insert 70 can be rotated relative to the core member 62 for adjusting the position of the recess 80 within the core member. The cylindrical insert 70 can be rotated in a clockwise direction or in a counterclockwise direction. As illustrated in FIG. 4c, the first cylindrical insert 70 has a central axis 71. A recess 80, which has a circular cross section in the illustrated embodiment, is formed in the first cylindrical insert 70, wherein the recess 80 is arranged eccentrically with respect to the central axis 71 of the first cylindrical insert 70.

In the embodiment illustrated in FIG. 4, the core member 62 further comprises a second cylindrical insert 72 rotatably arranged within the first hole 64 of the core member, wherein the diameter of the second cylindrical insert 72 exceeds the diameter of the first cylindrical insert 70. The second cylindrical insert 72 has a central axis 73 and a second hole 66 with a circular cross section, the second hole 66 being arranged eccentrically with respect to the central axis 73 of the second cylindrical insert. In the illustrated embodiment, the first cylindrical insert 70 is rotatably arranged within the second hole 66 of the second cylindrical insert. Just like with the first insert 70, the second cylindrical insert 72 can be rotated, clockwise or counter-clockwise, relative to the core member for adjusting the position of the recess 80 within the core member. Thus, an additional degree of freedom is added by the second cylindrical insert. FIGS. 4b and 4c illustrated different positions of the recess 80 obtainable by rotating the first insert 70, see left-hand and middle figure, and by rotating the second insert 72, see middle and right-hand figure.

In the embodiment illustrated in the top view of FIG. 5, the core member 62 further comprising a third cylindrical insert 74 rotatably arranged within the first hole 64 of the core member, wherein the diameter of the third cylindrical insert exceeds the diameter of the second cylindrical insert, the third cylindrical insert having a central axis and a third hole 68 with a circular cross section, the third hole being arranged eccentrically with respect to the central axis of the third cylindrical insert, and wherein the second cylindrical insert is rotatably arranged within the third hole of the third cylindrical insert.

FIG. 6 illustrates an embodiment in which the first cylindrical insert 70 is rotatably arranged directly within the first hole 64 of the structural member 62. FIG. 6 also illustrates the diameter Di and the height Hi of the insert. As also seen in FIG. 6, the first cylindrical insert 70 has a circular or disk-shaped top base 82, a circular or disk-shaped bottom base 84 and a side surface 86 in between the top base and the bottom base. The recess 80 is formed in the top base 82 in the illustrated embodiment.

FIG. 7 is a perspective assembled view of another embodiment of a structural member 62 of the present invention. This embodiment uses a first cylindrical insert 70 and a second cylindrical insert 72, both rotatably arranged within the first hole 64 of the structural member 62. Also, in this embodiment, the recess in the first insert 70 has a rectangular cross section.

The invention is not limited to the embodiments described herein and may be modified or adapted without departing from the scope of the present invention.

LIST OF REFERENCE NUMERALS 4 tower
6 nacelle
8 hub
10 blades
14 blade tip
16 blade root
18 leading edge
20 trailing edge
30 root region
32 transition region
34 airfoil region
36 pressure side shell part
38 suction side shell part
40 shoulder
41 spar cap
42 fibre layers
43 sandwich core material
45 spar cap
46 fibre layers
47 sandwich core material
50 first shear web
55 second shear web
51 sandwich core material
52 skin layers
60 blade mould
62 core member
64 first hole
66 second hole
68 third hole
70 first cylindrical insert
71 central axis of the first cylindrical insert
72 second cylindrical insert
73 central axis of the second cylindrical insert
74 third cylindrical insert
80 recess
82 top base
84 bottom base
86 side surface
90 functional component
L length
r distance from hub
R rotor radius

The invention claimed is:

1. A method of manufacturing a wind turbine blade (10) having a profiled contour including a pressure side and a suction side, and a leading edge and a trailing edge with a chord having a chord length extending therebetween, the wind turbine blade extending in a spanwise direction between a root end and a tip end, the method comprising the steps of: arranging a fibre lay-up including one or more fibre layers in the mould cavity of a blade mould (60), arranging a load-bearing structure (45) and a core member (62) on the fibre lay-up such that the core member (62) is arranged between the load-bearing structure (45) and the leading edge (18) and/or between the load-bearing structure (45) and the trailing edge (20), supplying resin to the fibre lay-up, the load bearing structure and the core member, and curing the resin, wherein the core member (62) comprises a first hole (64) with a circular cross section, a first cylindrical insert (70) rotatably arranged within the first hole (64) of the core member (62), the first cylindrical insert (70) having a central axis (71), a recess (80) formed in the first cylindrical insert (70), wherein the recess (80) is arranged eccentrically with respect to the central axis (71) of the first cylindrical insert (70).

2. A method according to claim 1, wherein the method further comprises inserting a functional component (90) into the recess of the first cylindrical insert after arranging the core member on the fibre lay-up.

3. A method according to claim 2, wherein the functional component (90) is selected from the group consisting of a receptor or a conductor of a blade lightning protection system, a fastening member such as a bolt, a sensor and a drainage device.

4. A method according to claim 1, wherein the method further comprises, after arranging the core member (62) on the fibre lay-up, rotating the first cylindrical insert (70) relative to the core member (62) for adjusting the position of the recess (80) within the core member.

5. A method according to claim 1, the core member (62) further comprising a second cylindrical insert (72) rotatably arranged within the first hole (64) of the core member, wherein the diameter of the second cylindrical insert (72) exceeds the diameter of the first cylindrical insert (70), the second cylindrical insert (72) having a central axis (73) and a second hole (66) with a circular cross section, the second hole (66) being arranged eccentrically with respect to the central axis (73) of the second cylindrical insert, and wherein the first cylindrical insert (70) is rotatably arranged within the second hole (66) of the second cylindrical insert.

6. A method according to claim 5, wherein the method further comprises rotating the second cylindrical insert (72) relative to the core member after arranging the core member on the fibre lay-up for adjusting the position of the recess (80) within the core member.

7. A method according to claim 1, the core member (62) further comprising a third cylindrical insert (74) rotatably arranged within the first hole (64) of the core member, wherein the diameter of the third cylindrical insert exceeds the diameter of the second cylindrical insert, the third cylindrical insert having a central axis and a third hole (68) with a circular cross section, the third hole being arranged eccentrically with respect to the central axis of the third cylindrical insert, and wherein the second cylindrical insert is rotatably arranged within the third hole of the third cylindrical insert.

8. A method according to claim 7, wherein the method further comprises rotating the third cylindrical insert (74) relative to the core member after arranging the core member on the fibre lay-up for adjusting the position of the recess (80) within the core member.

9. A method according to claim 1, wherein the method further comprises cutting a cylindrical opening into or through the core member to provide the first hole with a circular cross section and the first cylindrical insert.

10. A wind turbine blade according to claim 9, wherein the recess (80) is configured for receiving a blade component selected from the group consisting of a receptor or a conductor of a blade lightning protection system, a fastening member such as a bolt, a sensor and a drainage device.

11. A wind turbine blade according to any of claim 10, wherein the first, second and/or third hole is a through hole.

12. A wind turbine blade (10) having a profiled contour including a pressure side and a suction side, and a leading edge and a trailing edge with a chord having a chord length extending therebetween, the wind turbine blade extending in a spanwise direction between a root end and a tip end, wherein the wind turbine blade comprises a structural member (62) arranged within the blade, the structural member comprising a first hole (64) with a circular cross section, a first cylindrical insert (70) rotatably arranged within the first hole of the structural member, the first cylindrical insert having a central axis (71), a recess (80) formed in the first cylindrical insert, wherein the recess is arranged eccentrically with respect to the central axis of the first cylindrical insert.

13. A wind turbine blade according to claim 12, further comprising a second cylindrical insert (72) rotatably arranged within the first hole of the structural member, wherein the diameter of the second cylindrical insert exceeds the diameter of the first cylindrical insert, the second cylindrical insert having a central axis and a second hole (66) with a circular cross section, the second hole being arranged eccentrically with respect to the central axis of the second cylindrical insert, and wherein the first cylindrical insert is rotatably arranged within the second hole of the second cylindrical insert.

14. A wind turbine blade according to claim 12, further comprising a third cylindrical insert (74) rotatably arranged within the first hole of the structural member, wherein the diameter of the third cylindrical insert exceeds the diameter of the second cylindrical insert, the third cylindrical insert having a central axis and a third hole (68) with a circular cross section, the third hole being arranged eccentrically with respect to the central axis of the third cylindrical insert, and wherein the second cylindrical insert is rotatably arranged within the third hole of the third cylindrical insert.

\* \* \* \* \*